United States Patent

[11] 3,616,885

| [72] | Inventor | Glen R. Priest |
| | | 1802 Floyd, Lawton, Okla. 73501 |
| [21] | Appl. No. | 94,459 |
| [22] | Filed | Dec. 2, 1970 |
| [45] | Patented | Nov. 2, 1971 |

[54] OIL RECLAIMER
7 Claims, 5 Drawing Figs.

[52] U.S. Cl. .................................................. 196/128,
    210/180, 210/184, 208/179, 196/46.1
[51] Int. Cl. .................................................. B01d 3/28,
    C10g 7/00
[50] Field of Search .......................................... 196/128,
    46, 46.1; 202/236; 210/180, 182, 184; 208/179

[56] References Cited
UNITED STATES PATENTS

| 2,173,631 | 9/1939 | Niedens | 210/180 |
| 2,207,399 | 7/1940 | Goertner | 210/184 |
| 2,346,042 | 4/1944 | Morris | 210/184 |
| 2,377,988 | 6/1945 | Braun | 210/184 |
| 2,428,939 | 10/1947 | Morris | 210/184 |
| 2,785,109 | 3/1957 | Schwalge | 210/184 |
| 2,839,196 | 6/1958 | Schwalge | 210/180 |
| 3,550,781 | 12/1970 | Barrow | 210/180 |

*Primary Examiner*—Norman Yudkoff
*Assistant Examiner*—David Edwards
*Attorney*—Jack A. Kanz

ABSTRACT: Disclosed is a device comprising a canister containing a filter and an evaporation plate. The evaporation plate is basically a truncated cone with a plurality of annular concentric flat horizontal surfaces. Oil is forced through the filter and the evaporation plate into an evaporation chamber where volatile contaminates are removed by vaporization.

INVENTOR
GLEN R. PRIEST

ATTORNEY

INVENTOR
GLEN R. PRIEST

ATTORNEY

INVENTOR
GLEN R. PRIEST

ATTORNEY

OIL RECLAIMER

This invention relates to apparatus for use in connection with internal combustion engines to remove water or other volatile contaminates from the lubricating oil used in such engines. More particularly, it relates to a vaporization device which deemulsifies contaminated oil and vaporizes contaminates therefrom.

It has long been recognized that contamination of lubricating oil is one of the major causes of wear and deterioration of internal combustion engines. Solid contaminates such as dirt, metal particles and the like may be readily removed from the oil system by conventional filters. However, liquid contaminates such as condensate, water and fuel frequently are emulsified in lubricating oils and cannot be removed by particle filters.

In accordance with the present invention an apparatus is provided which deemulsifies the oil and removes volatile contaminates therefrom. The apparatus basically comprises a canister having a particle filter and a vaporization plate. Lubricating oil is forced upwardly into the particle filter, through a plurality of small openings in the vaporization plate and into a heated vaporization chamber which is vented to the atmosphere. The vaporization plate comprises a generally truncated cone structure having a plurality of substantially flat annular concentric vaporization rings. Lubricating oil is forced from the particle filter through the base of the vaporization plate and upwardly through small capillaries in the vaporization plate. The capillaries terminate in expansion cups in the surfaces of the vaporization rings. The lubricating oil is allowed to expand in the expansion cups and flow over the vaporization rings in a thin film. The oil film is heated to vaporize volatile diluents therefrom and the purified oil is collected for recirculation and use in the internal combustion engine.

Deemulsification of volatile contaminates in the oil is accomplished by forcing the oil through a small capillary and allowing it to expand in an expansion cup before spreading over the vaporization surface. By deemulsifying in this manner the volatile constituents are more readily vaporized, thus providing more complete decontamination of the oil in a single refining step. Furthermore, by allowing the oil to flow downwardly over the surface of the series of consecutive vaporization plates in a thin film, relatively complete vaporization of volatile constituents is accomplished. Other features and advantages of the invention will become more readily understood from the following detailed description taken in connection with the appended claims and attached drawings in which:

Figure 1:
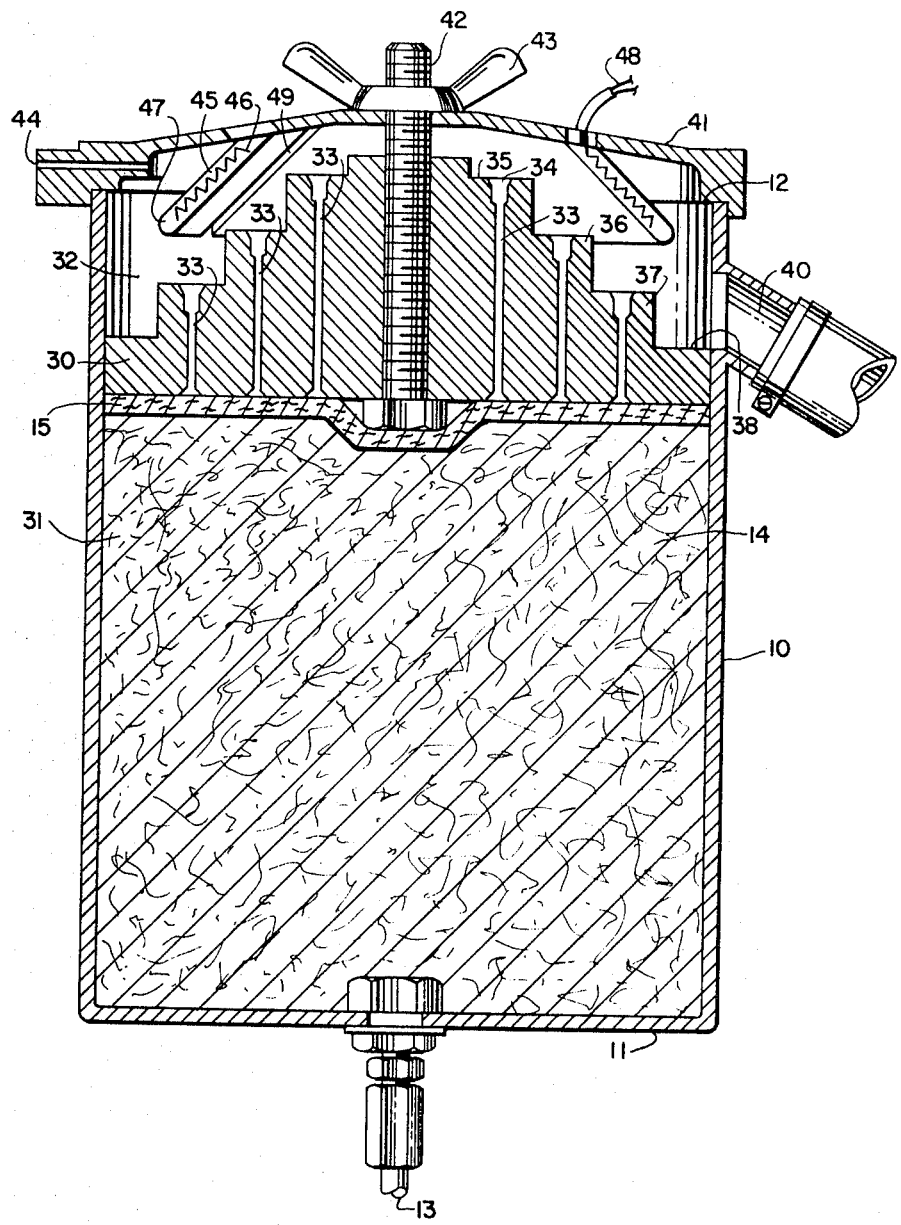
FIG. 1 is a sectional view of the preferred embodiment of the apparatus of the invention.

Referring now to the drawings, in which like numerals designate like parts, the preferred embodiments of the invention will be described. The apparatus as illustrated in FIG. 1 comprises a canister 10 of suitable dimensions having an enclosed base 11 and an open top 12. An oil inlet 13, preferably centrally located in the enclosed base 11 of canister 10 and in fluid communication with the recirculatory oil system in an internal combustion engine, is provided to introduce oil into the apparatus. The canister 10 is partially filled with a fibrous filter material 14. Positioned within the upper portion of the canister 10 is a vaporization plate 30. The base of vaporization plate 30 is substantially flat and the periphery thereof substantially conforms to the internal diameter of canister 10. It will therefore be observed that vaporization plate 30 divides canister 10 into a filter compartment 31 and a vaporization chamber 32. The filter compartment 31 is substantially filled with fibrous filter material 14. A felt pad 15 is positioned between the fibrous filter material and the base of vaporization plate 30. Fluid communication between the filter compartment 31 and the vaporization chamber 32 is provided solely by means of capillaries 33 passing substantially vertically through the vaporization plate 30.

Figure 3:
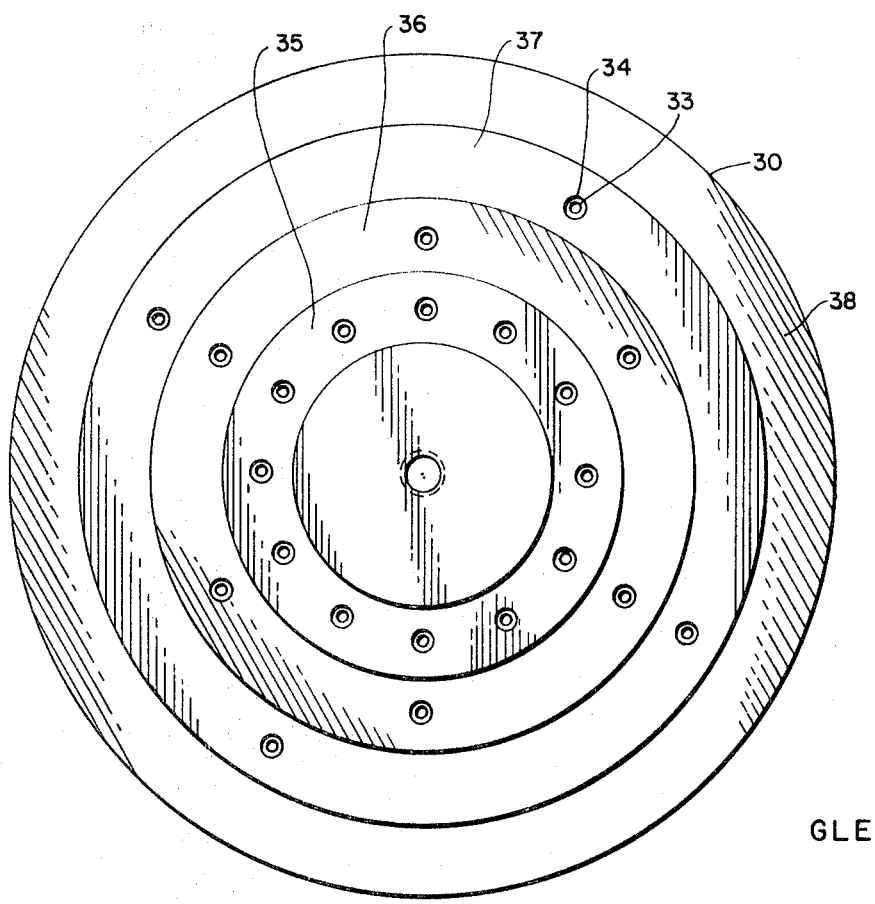
FIG. 3 is a top plan view of the vaporization plate of the invention.

As shown in FIGS. 1 and 3, vaporization plate 30 comprises a generally truncated cone structure, having a plurality of annular concentric flat tiers formed on the inclined surface of the cone. The surface of each tier is substantially flat and substantially parallel to the base of the cone. Capillaries 33 passing vertically through the vaporization plate 30 terminate in small expansion cups 34 in the face of the flat surfaces 35, 36 and 37 encircling the cone.

Expansion cups 34 are relatively shallow and have a diameter at least twice the diameter of capillaries 33. It will thus be observed that oil passing upwardly through capillaries 33 will expand in expansion cups 34. Furthermore it will be observed that oil overflowing from expansion cup 34 will flow over the surfaces of concentric rings 35, 36 and 37.

In order to obtain maximum vaporization from the oil within the vaporization chamber it is desirable that the oil pass through the chamber in a thin film. Accordingly, maximum surface area of the vaporization plate is obtained by using a truncated cone with concentric flat tiers encircling the cone. Oil enters the vaporization chamber 32 through capillaries 33 and expansion cups 34 on the top tier 35 and spreads over the surface of tier 35 in a thin, uniform film. The oil flows laterally outwardly to the edge of the tier and down the vertical side to the second tier 36. Likewise, oil may enter the vaporization chamber through capillaries 33 communicating with the surfaces of the second tier 36 and third tier 37. Since the oil spreads on the horizontal surfaces of the tiers 35, 36 and 37, as well as over the vertical surfaces interconnecting tiers 35, 36 and 37, a substantially larger surface area is obtained than would be obtained if the vaporization plate were a single flat plane. Furthermore, the oil entering the vaporization chamber from the top tier 35 must pass over the edges of tiers 35, 36 and 37 before reaching the bottom tier 38. Accordingly, each time the oil passes over the edge of a tier it is thinned by gravity and passes down the vertical sides in a thin film, further aiding in the vaporization of impurities therefrom.

It will be observed that a majority of the capillaries communicate with the top tier 35. However, since the oil cascading down the sides of the cone 30 is allowed to spread over an increasingly larger surface area additional oil may be supplied to the lower tiers to maintain a uniform thickness of oil. After the oil is passed down the vertical side of tier 37 it is collected on the surface of the lower concentric ring 38 and allowed to drain therefrom into exit conduit 40.

The top of canister 10 is suitably enclosed by means of a cap 41.

In the embodiment illustrated in FIG. 1, cap 41 is secured in place to enclose the top of canister 10 by means of a stud 42 passing through an aperture centrally disposed in the cap 41 and wingnut 43. A vent 44 is provided in cap 41 to provide communication between the vaporization chamber 32 and the atmosphere. Accordingly, vapors within the vaporization chamber 32 may exit through vent 44.

As illustrated in FIG. 1 the vaporization chamber is heated by heater 45 disposed within the chamber 32. Heater 45 is preferably in the form of an inverted dish depending from cap 41 within the chamber 32. As illustrated in FIG. 1, heater 45 depends from cap 41 at an angle substantially corresponding to the general slope of vaporization plate 30. The heater illustrated in FIG. 1 comprises an electrical resistance heater having coils 46 disposed within a supporting matrix 47 and in electrical communication with leads 48. Leads 48 may be appropriately interconnected with any suitable power source to supply electrical current to the heating coils 46. Since heater 45 is an inverted dish-shaped device depending from cap 41, a vent 49 is provided therein to allow vapors within the dish to escape from the heater and be removed from the vaporization chamber.

Operation of the apparatus will be readily understood from the foregoing description. Oil is forced into the filter compartment 31 through inlet 13 and flows upwardly through the fibrous filter material 14 and felt pad 15. When the filter compartment 31 is filled with oil the oil is forced upwardly through capillaries 33 into expansion cups 34. The oil expands in the expansion cups 34 and flows laterally over the surfaces of vaporization rings 35, 36 and 37. Oil from the top ring 35 flows laterally over the ring 35 and downwardly along the vertical edges of ring 35 to vaporization ring 36. When the film uniformly covers the surface of vaporization ring 36 it flows downwardly over the sides thereof onto vaporization ring 37 and likewise downwardly to collection plate 38.

As the oil flows over the surfaces of vaporization rings 35, 36 and 37 it is heated by heat radiated from heater 45. Heater 45 preferably depends downwardly from the cap 41 and is spaced a uniform distance from the vaporization rings so that all the vaporization rings are uniformly heated to a temperature between about 175° F. and about 225° F. Preferably the oil on the surface of each vaporization ring is maintained at a temperature of approximately 200° F. At this temperature volatile impurities in the oil are evaporated therefrom and exit from the vaporization chamber through outlet 44 to the ambient atmosphere. The purified oil is collected on the lower ring 38 and allowed to drain therefrom into conduit 40 for reuse in the internal combustion engine.

Figure 2:
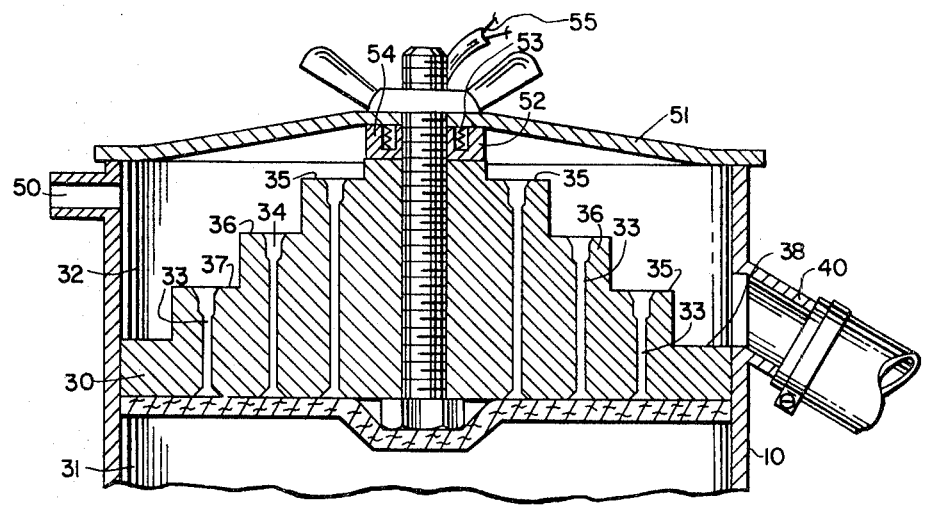
FIG. 2 is a sectional view of an alternate embodiment of the invention.

An alternative arrangement for the heating device is illustrated in FIG. 2. The vaporization plate 30 and canister 10 in FIG. 2 are identical in all respects to that shown and described with reference to FIG. 1 with the exception that vent 50 is provided in the sidewall of canister 10. In the embodiment illustrated in FIG. 2, however, top enclosure 51 carries a resistance heater 52 adapted to physically engage the top surface of vaporization plate 30.

Heater 52 comprises a resistance heating element 53 carried in a suitable thermally conductive jacket 54 which is adapted to engage the top of the vaporization plate 30. It will thus be observed that when heater 52 is in place and current passed through leads 55, heat generated by the resistance coils 53 will be conducted to the vaporization plate 30 to maintain the surface of the vaporization plate 30 at the desired temperature. Operation of the device of FIG. 2 is essentially identical in all other respects to the device illustrated in FIG. 1.

Figure 4:
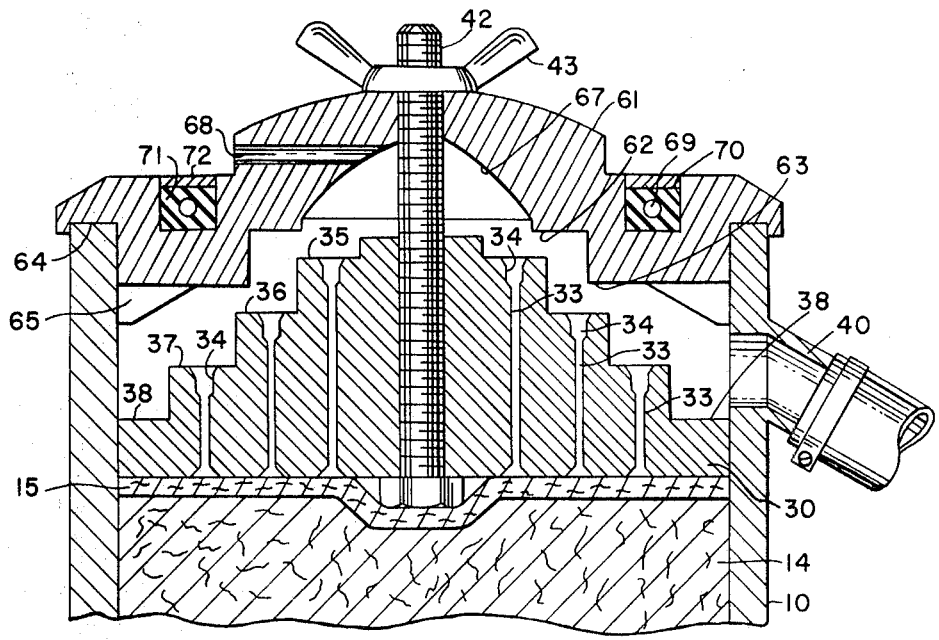
FIG. 4 is a sectional view of another embodiment of the invention.
Figure 5:
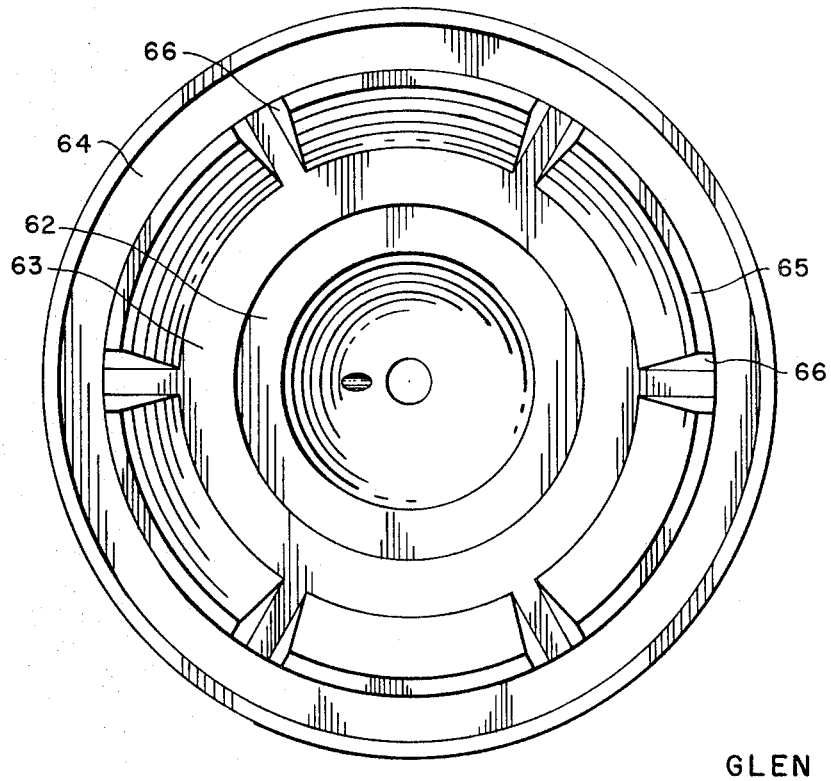
FIG. 5 is a bottom plan view of the enclosure cap shown in FIG. 4.

Another embodiment of the invention is illustrated in FIGS. 4 and 5. The evaporation plate 30 and canister 10 of FIG. 4 are identical in all respects to that shown and described with reference to FIG. 1. The enclosure cap 61, however, is provided with concentric flat surfaces 62 and 63 which are spaced from and substantially parallel to vaporization surfaces 35 and 36, respectively. Enclosure cap 61 is preferably a unitary body of cast or milled aluminum with sealing edges 64 formed about the underside of the outer edge adapted to mate with the open top 12 of canister 10. A reflecting shroud 65 depends from the underside of cap 61 near the outer periphery thereof. The shroud 65 is generally coextensive with the bottom tier 38 and about half of tier 37 on the evaporation plate 30. Surfaces 62 and 63 are substantially parallel to vaporization rings 35 and 36, respectively. Surfaces 62 and 63 are substantially parallel to vaporization rings 35 and 36, respectively. Surfaces 62 and 63 are preferably spaced from surfaces 35 and 36 approximately one-fourth inch. Shroud 65 is preferably provided with vents 66 to allow oil to flow through the device when the oil is cold, such as at start-up, or when the heater is inoperative.

The central portion of cap 61 is preferably upwardly recessed to form a dome 67. A vent 68, providing communication between the evaporation chamber and atmosphere, preferably enters the chamber near the top of dome 67.

A resistive heating coil 69, or any other suitable heating means, is imbedded in recess 70 in the top side of cap 61. Recess 70 is preferably a circular recess substantially coplanar with and directly above vaporization surface 37. Since cap 61 is preferably formed of thermally and electrically conductive material, such as aluminum, resistance coil 69 is preferably encased in a suitable electrical insulator, such as plastic, glass wool or the like.

It will be observed that in the embodiment of FIG. 4, enclosure cap 61 provides heat radiating surfaces which are spaced from and substantially parallel to the vaporization surfaces in both the vertical and horizontal planes. Thus heat from the resistive element 69 is uniformly radiated over substantially all of the vaporization surfaces to provide uniform temperatures over all surfaces of plate 30.

From the foregoing description it will be observed that volatile impurities are removed from oil circulated through the apparatus, thus repurifying the oil for reuse. When the oil enters the vertical capillaries 33 volatile impurities such as unused fuel, water or the like are entrained in the oil in an emulsified condition. Since the capillaries are quite small, on the order of 0.096-inch diameter, the oil is under a slight pressure. However as the oil enters the expansion cups 34, the oil is allowed to expand and be deemulsified. Upon deemulisfication the diluents entrained therein are more easily evaporated from the oil. Since the oil flows over the sides of the vaporization plate in a thin film immediately after being deemulsified, the diluents are readily vaporized and removed from the oil.

It is to be understood that although the invention has been described with particular reference to electrical resistance heaters, other heating means may be substituted for those shown and described to accomplish essentially the same results. Likewise, while the invention has been disclosed with reference to a vent simply venting the evaporated impurities to the atmosphere, it will be readily appreciated that other means may be used to extract the vaporized diluents from the vaporization chamber. For example, a partial vacuum or venturi system may be employed to withdraw the vaporized diluents from the vaporization chamber.

While the invention has been described with particular reference to specific embodiments thereof, it will be understood that the form of the invention shown and described in detail is to be taken as a preferred embodiment of same and that various changes and modifications may be resorted to without departing from the spirit and scope of the invention as defined by the appended claims.

What is claimed is:

1. Apparatus for removing volatile impurities from lubricating oil comprising:
   a. a container;
   b. an evaporation plate positioned within said container, said evaporation plate defining the floor of an evaporation chamber within said container and comprising a substantially truncated cone-shaped body having a plurality of annular concentric tiers formed on the inclined surface thereof, the surfaces of said concentric tiers being substantially flat and parallel to the base of said body;
   c. a plurality of capillaries passing vertically through said evaporator plate from the base thereof to the surface of at least the top concentric tier;
   d. enclosure means for enclosing the top of said container and defining the top of said evaporation chamber;
   e. means for heating the surfaces of said tiers;
   f. vent means to permit vaporized materials to escape from said vaporization chamber; and
   g. means for conducting oil from said vaporization chamber.

2. Apparatus as defined in claim 1 wherein said capillaries terminate in relatively small cups formed in the surfaces of said concentric tiers, the diameter of said cups being at least twice the diameter of said capillary.

3. Apparatus as defined in claim 1 wherein the side of said body joining the surfaces of two adjacent concentric tiers is substantially vertical.

4. Apparatus as defined in claim 1 wherein said means for heating the surfaces of said concentric tiers comprises an electrical resistance heater in the shape of a hollow truncated cone depending from said enclosure means and spaced from the surfaces of said concentric tiers.

5. Apparatus as defined in claim 1 wherein said evaporation plate has at least four of said annular concentric tiers formed on the inclined surface thereof, wherein more of said capillaries passing through said evaporation plate communicate with the top one of said tiers than with any other tier, and wherein no capillaries communicate with the bottom one of said tiers.
X 6. The apparatus defined in claim 5 wherein said evaporation plate includes only sufficient numbers of said capillaries communicating with the surfaces of the concentric annular tiers between the top one of said tiers and the bottom one of said tiers to maintain substantially uniform thickness of oil on the surfaces of all of said tiers above the bottom one of said tiers.

7. Apparatus as defined in claim 1 wherein said enclosure means for enclosing the top of said container includes a plurality of substantially flat annular surfaces spaced from and substantially parallel to said surfaces of said concentric tiers on said evaporation plate, two of said annular surfaces being joined by a substantially vertical surface which is substantially parallel to and spaced from the vertical side joining two of said surfaces of said concentric tiers.

* * * * *